(12) United States Patent
Salinger et al.

(10) Patent No.: US 8,522,294 B2
(45) Date of Patent: Aug. 27, 2013

(54) DEVICE, SYSTEM AND METHOD TO PROVISION, CONFIGURE AND OPERATE VIDEO GENERATION EQUIPMENT

(75) Inventors: Jorge Salinger, Littleton, CO (US); Vik Saxena, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 877 days.

(21) Appl. No.: 12/583,159

(22) Filed: Aug. 13, 2009

(65) Prior Publication Data

US 2011/0037902 A1    Feb. 17, 2011

(51) Int. Cl.
*H04N 5/268*    (2006.01)

(52) U.S. Cl.
USPC ........................................................ 725/105

(58) Field of Classification Search
None
See application file for complete search history.

(56) References Cited

U.S. PATENT DOCUMENTS

| | | | | |
|---|---|---|---|---|
| 2003/0061614 A1* | 3/2003 | Wood et al. | | 725/73 |
| 2009/0106806 A1* | 4/2009 | Lee et al. | | 725/110 |
| 2009/0150953 A1* | 6/2009 | Oh et al. | | 725/111 |
| 2009/0300673 A1* | 12/2009 | Bachet et al. | | 725/31 |
| 2010/0011397 A1* | 1/2010 | Baran et al. | | 725/90 |
| 2010/0274882 A1* | 10/2010 | Woundy et al. | | 709/223 |
| 2012/0079552 A1* | 3/2012 | Choi et al. | | 725/118 |

OTHER PUBLICATIONS

Data-Over-Cable Service Interface Specifications, CableLabs May 29, 2009; http://www.cablelabs.com/specifications/CM-SP-eDOCSIS-I18-090529.pdf.

* cited by examiner

*Primary Examiner* — Vivek Srivastava
*Assistant Examiner* — Rong Le
(74) *Attorney, Agent, or Firm* — Banner & Witcoff, Ltd.

(57) ABSTRACT

A video generation device, system and method. The device, system and method may perform the configuration of the video generation device, and thus may include a configuration file and a file format. The device, system and method may include at least one processing unit communicative with at least one cable modem, at least one application specific output generated from the processing unit, and a plurality of inputs to at least one processing unit for receiving at least a video input, a management input, and a configuration input, wherein the configuration input may include configuration information for processing the other received inputs. In embodiments, the video input, the management input, and the configuration information may be processed by at least one processing unit to at least one application specific output.

14 Claims, 9 Drawing Sheets

| Type | Length | Value | Description |
|---|---|---|---|
| 217.53.1 | (1..32) | Text | MDTA-CC – 6.2.7.1 provides SNMP daemon v1/v2c community string |
| 217.8 | 1 | 1/0 | MDTA-CC – 6.3.1 Enable/Disable Analog Output Port (mixed-services) |
| 217.9 | 1 | 1/0 | MDTA-CC – 6.3.1 Enable/Disable MDTA Bypass Port |

| Type | Length | Value | Description |
|---|---|---|---|
| 217.53.1 | (1..32) | Text | MDTA-CC – 6.2.7.1 provides SNMP daemon v1/v2c community string |
| 217.8 | 1 | 1/0 | MDTA-CC – 6.3.1 Enable/Disable Analog Output Port (mixed-services) |
| 217.9 | 1 | 1/0 | MDTA-CC – 6.3.1 Enable/Disable MDTA Bypass Port |

FIGURE 5

| Type | Length | Value | Description |
|---|---|---|---|
| 217.10.x | 2 | Source ID | Output Channel Map. Source ID to EIA channel number for non-auxiliary channels. Subtypes (217.10.x) are used to set the source ID for output channels where x corresponds to the EIA channel number. |
| 217.20 | 2 | Text | Configuration file version. To facilitate the change to automatic OOB SI. |
| 217.21 | 1 | 1/0 | Enable/Disable Craft Interface. |
| 217.22 | 41 | Text | This TLV occurs at the end of the 217 section. It is the SHA1 sum of all preceding data in the 217 section. |
| 217.23 | 4 | IP | Firmware upgrade TFTP server IP. |
| 217.24 | (1..255) | Text | Firmware upgrade path and filename. |
| 217.25 | 2 | VCT_ID | VCT ID. This defines the virtual channel table to be parsed for PSI. |
| 217.26.x | 1 | EIA output channel | Auxiliary Output Channel Map. Auxiliary Input ID to EIA channel number. Subtypes (217.26.x) are used to set the EIA output channel number for auxiliary input ID corresponding to x. |
| 217.29 | 1 | 1/0 | Enable/Disable Test Mode. |

FIGURE 6

| type, length, value for parameter 1 |
|---|
| type, length, value for parameter 2 |
|  |
|  |
| type, length, value for parameter n |

| VCTID: 0 ||
|---|---|
| EIA Channel | Source ID |
| 2 | 2001 |
| 3 | 2007 |
| 4 | 4083 |
| .... ||

FIGURE 8

DEVICE, SYSTEM AND METHOD TO PROVISION, CONFIGURE AND OPERATE VIDEO GENERATION EQUIPMENT

CROSS-REFERENCE TO RELATED APPLICATIONS

N/A

BACKGROUND

1. Field of the Disclosure

The disclosure relates to video content delivery and video generation equipment, and, more particularly, to an automated provisioning engine, system, device and method to configure, activate and operate video generation equipment.

2. Description of the Background

The Data Over Cable Service Interface Specification, herein referred to as DOCSIS, supports Internet Protocol (IP) traffic over, for example, digital cable TV channels. Most cable modems (CM or eCM) are thus DOCSIS compliant. More specifically, DOCSIS is a set of specifications for high speed, full duplex (FDX) data communications over CATV networks. DOCSIS was developed by the Multimedia Cable Network Systems Partners Ltd. (MCNS), and currently is administered by Cable Television Laboratories (CableLabs).

The original DOCSIS specifications were targeted for use in set-top boxes and the aforementioned CM. DOCSIS specifications are for always-on IP access, thereby avoiding the delays characteristic of other methodologies, such as circuit-switched modem access via the public switched telephone network (PSTN). DOCSIS also specifies asymmetric data transmission, which is typical of high speed IP communications.

In typical DOCSIS embodiments, downstream transmission typically takes place over one or more 6 MHz channels in the range between 54 MHz and 1000 MHz. For these transmissions, DOCSIS 2.0 specifies several variations of quadrature amplitude modulation (QAM). For example, a 64 QAM yields six bits per symbol and a signaling rate of 36 Mbps per 6 MHz channel. A 128QAM yields seven bits per symbol and increases the signaling rate to 42 Mbps. A 256QAM increases the signaling rate to 48 Mbps. These variations of QAMs are capable of transporting video streams that have been compressed using standards developed by the Moving Picture Experts Group (MPEG). These compression standards, such as MPEG-2 or MPEG-4, are commonly utilized in CATV networks, where downstream data is encapsulated into MPEG-2/MPEG-4 packets. Also, in DOCSIS embodiments, upstream transmission typically uses either quadrature phase shift keying (QPSK) modulation or one of the QAM modulation techniques.

The Multi-Dwelling Transport Adapter (MDTA), like several variants of cable set-top boxes, employs DOCSIS in a resident eCM, and may have an assigned physical unit identification for communication using that eCM. It is this identification that is used to assign data, such as a channel map, or channel lineup, to each set top box. More specifically, a channel map is assigned to each physical unit identification, thereby instructing the set top box as to which programs it is receiving and is entitled to receive.

Further, in typical set top boxes known in the pertinent art, the set top box, upon assessing the channel map assigned to its physical identification, obtains, from the data stream at the respectively assigned points in the data stream, only the channel that set top box is instructed to obtain, if so entitled. In other words, typical set top boxes do not tune to an analog frequency to which channel 2 is assigned, for example, but rather shift to the location of channel 2 in the received data stream and obtain channel 2 therefrom, if so entitled.

At present, video generation equipment, such as the DTA or MDTA, may use one or more specified inputs, and one or more specified outputs. However, the current art does not provide video generation equipment that converts inputs, such as generic inputs, to an output that is application specific, but rather provides video generation equipment that operates the output based on the assigned channel map input as referenced hereinabove. Further, current video generation equipment does not use an automated provisioning process to configure and operate such video generation equipment, and neither do they offer provisioning and configuration features that allow conversion of inputs to application specific output. As such, conventional video generation equipment solutions provide only fixed output configuration based on specified inputs, and offer no capability to remotely access, manage, or modify such video generation equipment in order to configure, reconfigure, activate, deactivate, and/or operate that video generation equipment, for example.

Certain applications, such as a Multi-Dwelling Transport Adapter (MDTA) for analog signal outputs, or using QAM to QAM for digital signal outputs, or using MDU and/or the like for hospitality campuses, in-building use, hospitals, and the like, require local regeneration of video signals, local output mapping, and/or local insertion of programming, content, or programming information, such as through the use of a DTA, MDTA, other video generation equipment, or equivalents thereto. The video generation equipment currently in use for such applications provides a variety of functions, including conversion, decryption, encryption, re-encryption, insertion, and deletion, among others, each of which requires configuration and management of that video generation equipment. However, as discussed hereinabove, such video generation equipment is not currently used for receiving indicators, data, or other information for "real time" and/or remote configuration and management of the video generation equipment.

Content directed to the video generation equipment discussed hereinthroughout may be inserted, modified, relocated or replaced, as discussed, such as wherein part of a broadcast network feed is moved or replaced with an alternative feed or with content unique to a local station or system, for example. Such content insertion or modification may be, for example, a simple station identification, an audio, video, or audiovisual advertisement, a traffic or weather report, a watermark, an overlay, or a new channel.

More specifically, automated local insertion has historically been triggered with in-band messaging, such as DTMF tones or sub-audible sounds (such as 25 Hz), and may also now be triggered with out of band messaging, such as using analog signal subcarriers or digital signals. For example, in an emergency, such as severe weather, local insertion may occur via command from a network or other source, such as the Emergency Alert System. In such a case, a simple video switch may be triggered to perform a transition to the insertion source, in part because current video generation equipment is not real time configurable to account for such circumstances.

Further, in digital operations, such as operations using IP, insertion or modification would preferably be processed digitally and remotely, such as to avoid unnecessary delays and/or to avoid losing potential advertising revenue.

Therefore, needs exist for a system, device and method to: configure, activate and operate video generation equipment, such as to produce application specific output; use existing in-plant information within the video generation equipment, such in-plant information including in-band and out of band messaging; and to use data exchange methodologies, such as DOCSIS, to define a real time configuration file to perform such configuration, activation and operation of the video generation equipment.

SUMMARY OF THE DISCLOSURE

The disclosure relates to a video generation device, system and method. The device, system and method may perform the configuration of a video generation device, and thus the disclosure also includes a unique configuration file and file format.

The device and system may include at least one processing unit that communicates via at least one cable modem, at least one application specific output generated from the processing unit, and a plurality of inputs to the at least one processing unit for receiving at least a video input, a management input, and a configuration input, wherein the configuration input may include configuration information for processing the other received inputs. In exemplary embodiments, the video input, the management input, and the configuration information may be processed by the at least one processing unit to at least one application specific output. At least two of the inputs may be received via the at least one cable modem.

The aforementioned at least one processing unit may be an MDTA processor. In various embodiments, the video input may include a channel lineup description, such as in a SEC-65 format, a PSIP format, or a SNMP format. The configuration input may operate on a plurality of in-band messages and, in certain exemplary embodiments, a plurality of out of band messages. The in-band messages may be transported utilizing QAM technology, and the out of band messages may utilize QPSK, for example.

In exemplary embodiments, the configuration input may be a DOCSIS style configuration file. As such, the configuration file may include an assigned one of a plurality of available virtual map identifications, and may operate in accordance therewith on a plurality of source identifications and a plurality of frequency channel assignments to correspond and, in some cases, uniquely correspond, the plurality of frequency identifications to the plurality of source identifications according to the assigned virtual map identification.

The configuration file may be in type-length-value format. The source identifications referenced hereinabove may identify remote sources and/or received data stream sources, and may additionally include one or more local and/or auxiliary sources. The plurality of channel assignments may include EIA channel assignments.

The application specific output may include a channel lineup. This channel lineup may be in analog format, such as for providing programming to analog tuner channel frequencies, such as for display on a television set or similar device. In additional embodiments, the output of the channel lineup and/or the programming may be digital, such as MPEG or Internet Protocol (IP) formats.

Similarly, the disclosed methods may include receiving, such as in type-length-value format, a DOCSIS style configuration file. Such a configuration may include an assigned one of a plurality of virtual channel table identifications, a plurality of source identifications, a plurality of EIA channel assignments, and other configuration information. The method may further include processing each of the plurality of source identifications to uniquely correspond to each of the plurality of EIA channel assignments as dictated by the assigned one of the plurality of virtual channel table identifications, generating an output channel lineup in accordance with the processing, and generating video content in accordance with the output channel lineup.

Additionally, the method provides a mechanism for correlating the information obtained from the DOCSIS-style configuration file and the in-band and out-of-band data already available in the plant to establish the precise location of video program information in an automated manner. This method also supports changes in the physical program location in an automated manner, thus avoiding the need to make changes in the DOCSIS-style configuration file.

Thus, the embodiments provide a system, device and method to configure, activate and operate video generation equipment to provide application specific output. The embodiments may use in-plant information within the video generation equipment—such in-plant information includes in-band and out of band messaging—and may analogize to methodologies already employed in data exchange, such as DOCSIS with regard to eCM, to define a real time configuration file to perform such configuration, activation and operation.

BRIEF DESCRIPTION OF THE DRAWINGS

Understanding of the disclosure will be facilitated by consideration of the following detailed description of the embodiments, taken in conjunction with the accompanying drawings, in which like numerals refer to like parts and in which:

FIG. 5 is a formatting diagram in accordance with an exemplary embodiment of the disclosure;

FIG. 6 is a formatting diagram in accordance with an exemplary embodiment of the disclosure; and FIG. 7 is a formatting diagram in accordance with an exemplary embodiment of the disclosure;

FIG. 8 is a formatting diagram in accordance with an exemplary embodiment of the disclosure.

DETAILED DESCRIPTION

Figure 1:
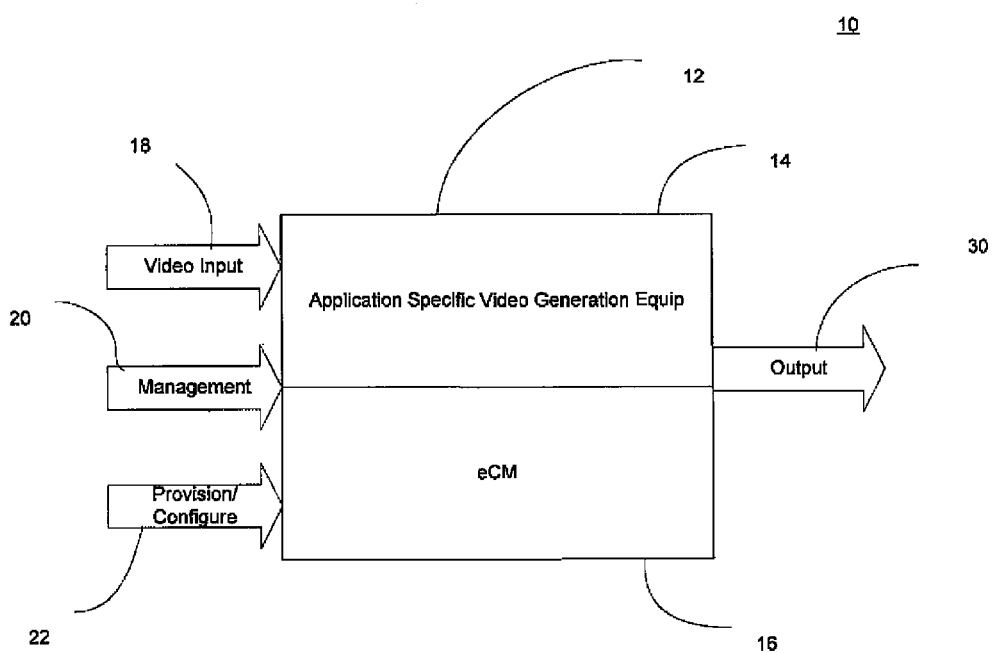
FIG. 1 is a block diagram illustrating exemplary aspects of a device, system and method in accordance with an embodiment of the disclosure.

It is to be understood that the figures and descriptions have been simplified to illustrate elements that are relevant for a clear understanding, while eliminating, for the purpose of brevity, many other elements found in typical video generation devices and methodologies. Those of ordinary skill in the art will thus recognize that other elements and/or steps may be desirable and/or required in implementing the disclosure. However, because such elements and steps are well known in the art, a discussion of such elements and steps is not provided herein. The disclosure herein is directed to all such variations and modifications of such elements and methods known to those skilled in the art. Furthermore, the embodiments identified and illustrated herein are for exemplary purposes only, and are not meant to be exclusive or limited in their description.

A Multi-Dwelling Transport Adapter (MDTA) is a device that, in general, performs the simultaneous decoding of at least 82 MPEG-2/SD digital video streams, and that may perform bulk decryption on channels that are encrypted, and/or that may perform re-modulation. For example, an MDTA may tune and demodulate multiple QAMs in order to recover MPEG video streams contained within those QAMs, and then convert those streams to an analog television format, such as National Television System Committee (NTSC) format. These NTSC analog channels may then be un-encrypted for display on an analog television set, for example. As used herein, reference to an MDTA is to include reference to a DTA, where applicable, and to any and all video generation devices and systems similar to an MDTA in operation and/or application.

An MDTA may receive inputs, and process, modify and manipulate such inputs to thereby produce one or more outputs, such as application specific output. For example, the MDTA may, at its input, receive digital video channels in an MPEG format along with data regarding channel assignments and channel sources, and may output in accordance therewith a channel lineup and video content assigned by channel frequency in accordance with the channel lineup. Those skilled in the art will appreciate that the use of "input" and "output" herein does not necessarily denote discrete physical inputs, outputs, ports, lines, or the like, but rather indicates input and output of information generally.

In order to readily perform the processing, modifying and/or manipulating discussed hereinthroughout, the MDTA may preferably include one or more microprocessors associated with one or more data storage mechanisms, such as computing memory, and further be associated with computing code resident on the one or more microprocessors and/or the one or more data storage mechanisms. The computing code, when executed by the one or more processors, causes the implementation of the systems and methods discussed hereinthroughout, for example.

The disclosed MDTA may provide processing through a provisioning and configuration system that may employ a genericized video input, a genericized management input, and that may institute a DOCSIS style provisioning and configuration process. The DOCSIS style configuration of the MDTA, exclusive from the DOCSIS provisioning of an eCM associated with the MDTA, may enable generation from the MDTA of application specific video content based on genericized inputs. Thus, the configuration of the MDTA disclosed herein is flexible in the acceptable inputs, the specific outputs, and the local or remote nature of the management of the video generation system, for example.

FIG. 1 is a block diagram that illustrates aspects of a video generation device system 10 comprising an MDTA 12. More specifically, FIG. 1 illustrates a genericized video input 18, which may include, for example, a channel lineup description in any format, such as standard formatting using SEC-65, PSIP, SNMP, system information or system format, and generic video content. As used herein, generic video content may include any content or content type that may be provided for execution from a video generation device or system for output on a video display device, such as for output on a television set, computer monitor, a mobile device, or the like.

Further illustrated in FIG. 1 is a management input 20, which may be any conventional management software, including but not limited to, Management Information Base (MIB, herein defined as, in a Simple Network Management Protocol system, a hierarchical data structure that describes objects for which a device can report the status and set the value), a communications protocol, an interface or interface listing, such as console ports or remote user interfaces, or a Simple Network Management Protocol (SNMP, which, as defined herein, allows a TCP/IP host running an SNMP management application to query nodes for network-related statistics and information). FIG. 1 also illustrates a provisioning and configuration input 22, which may receive: a local monitoring and/or a local configuration, or a local configuration file and information for configuration in accordance therewith; a remote monitoring and/or a remote configuration, or a remote configuration file and information for configuration in accordance therewith; and any combination thereof.

The management and/or provisioning/configuration may be administered from, and the aforementioned inputs 18, 20, 22 generally received from, one or more remote locations using, for example, an embedded cable modem (eCM) 16 of the MDTA 12. A standard eCM 16 may include a module package operable using the e-DOCSIS specification, which is defined at, for example, http://www.cablelabs.com/specifications/CM-SP-eDOCSIS-I18-090529.pdf. More specifically, the eCM 16 may perform a network entry process in accordance with the DOCSIS specification, including obtaining a network configuration, obtaining a time and date, downloading a DOCSIS configuration file, and registering and completing DOCSIS network entry. Upon completion of the network entry by the eCM, the MDTA may begin network entry.

The MDTA 12 may begin network entry with an IP initialization. The MDTA IP initialization process may include establishing IP connectivity, followed by obtaining a network configuration, a time and date, and, optionally, a password and an event log as will be understood by those skilled in the pertinent arts. The MDTA 12 may further download, such as via TFTP, a configuration file as discussed hereinthroughout. The MDTA 12 may then map genericized inputs to particular output in accordance with the downloaded input 22, which may be an input, a configuration, and/or a configuration file, for example. In an exemplary embodiment, if this mapping is unsuccessful, or if a non-corrupt configuration file cannot be downloaded, mappings may be enabled using the last known good configuration.

The inputs 18, 20, 22 illustrated in FIG. 1 may thus be processed, in the manner dictated through the configuration input 22, within the video generation equipment 14, such as the MDTA 12, and one or more outputs 30 may be generated in accordance therewith, such as application specific video output 30. The application specific video output 30 may preferably include, for example, a channel lineup description and video content for display.

Thereby, in accordance with the disclosure, input of channel lineup information, such as a source and a channel frequency assignment, may be provided for use by a configuration file 22, along with, for example, assignments for local auxiliary inputs (not shown). Control mechanisms may additionally be provided with the configuration, including, for example, assignments, applications, and insertions, such as emergency alerts, closed captioning, guide data, advertisements, and the like, and such configuration may allow, based on the processing of the inputs, for the generation of application specific output, such as an output channel lineup and video content. As such, the embodiments of the disclosure may use existing video generation equipment and video infrastructure to process and manage, via a normalized configuration, the video generation equipment for the application specific output of, for example, channel lineup and video with, for example, insertions, without need of new equipment and infrastructure. The disclosure thus provides a configurable and recoverable localized device system 10, allows for application-specific generation of an analog channel lineup, and simplistically allows for regeneration or insertion of programming, such as standard definition or high definition digital programming.

Figure 2:
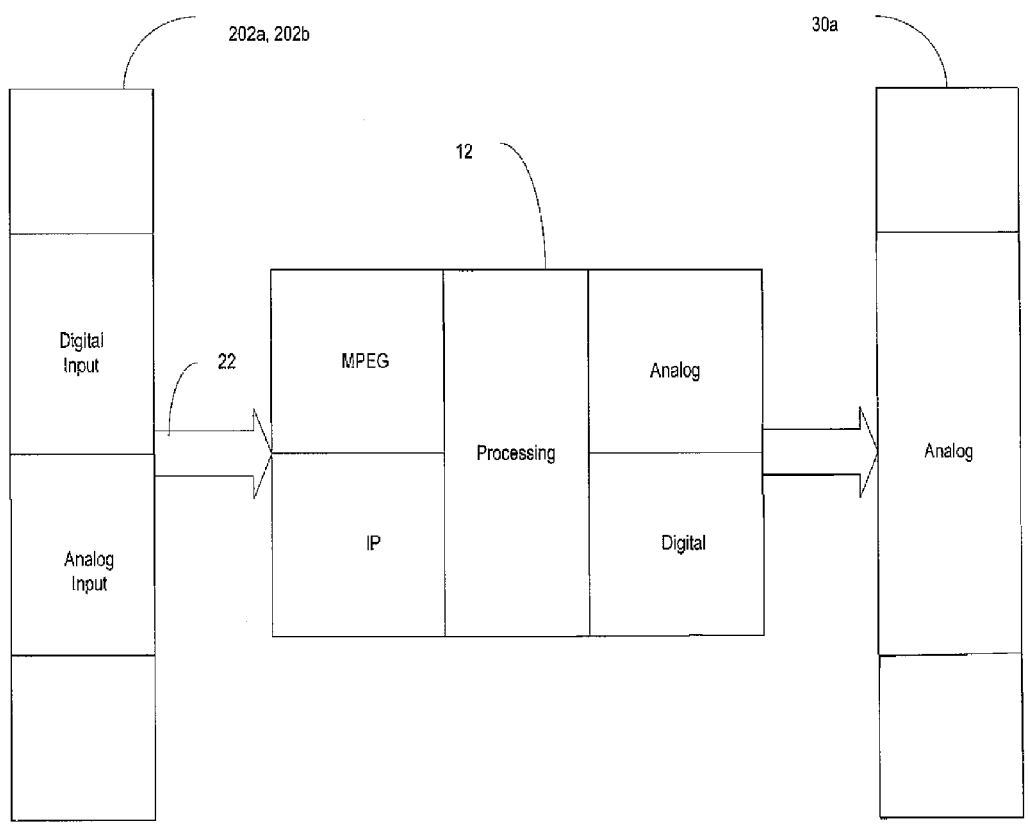
FIG. 2 is a block diagram illustrating exemplary aspects of a device, system and method in accordance with an embodiment of the disclosure.

FIG. 2 is a block diagram that illustrates a specific exemplary embodiment of an MDTA configuration. As illustrated in FIG. 2, the MDTA 12 may receive a configuration file input 22 instructing a particular configuration, along with analog 202a and/or digital input 202b, such as simulcast analog and digital channel data, and/or in-band messaging data, such as the channel mapping source and channel assignment information discussed hereinthroughout, for example. The MDTA processes the inputs along with any input management information in accordance with the configuration input 22, and correspondingly outputs a channel lineup 30a, such as in an analog format, for example, responsive to and based upon the received inputs.

Of course, those skilled in the art will appreciate, in light of the discussion herein, that the systems and methods disclosed may be employed in numerous alternative embodiments in addition to the analog/digital in-analog out embodiments discussed hereinabove, and/or may be employed in embodiments not employing an MDTA. Such additional and alternative embodiments include, for example, a digital in, such as a QAM in, and a digital out, such as a QAM out, embodiment.

Figure 3:
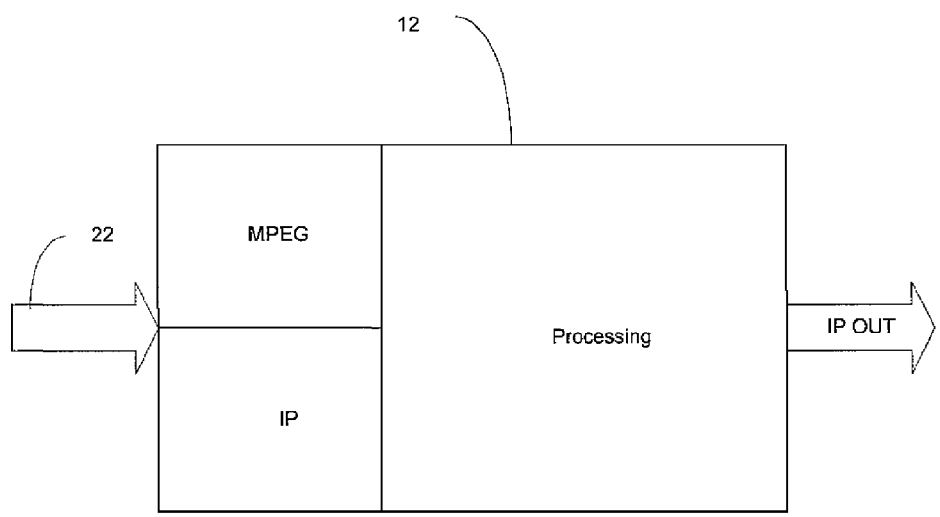
FIG. 3 is a block diagram illustrating exemplary aspects of a device; system and method in accordance with the an embodiment of the disclosure.

More specifically, FIG. 3 is a block diagram illustrating an additional exemplary embodiment in which the MDTA receives video streams in the form of IP and/or MPEG data in, processes the input data, and outputs video streams in the form of IP data. In each such alternative embodiment, although the manufacturer of the MDTA or like device may differ, and the provisioning may differ, the configuration file 22 and file format may be consistently employed as discussed herein.

The configuration file 22 discussed hereinthroughout may be of a configuration file format based on the DOCSIS-type format, for example. Configuration of the MDTA 12 may use the DOCSIS-style configuration file 22 upon loading via a file transfer protocol, such as TFTP, during the network entry process, for example. All static configuration settings for the MDTA 12 may be supplied using this configuration file 22. In other words, the configuration file 22 may instruct the MDTA 12 what is to be received via the inputs 18, 20, 22, how to manipulate and process the received information, and the resultant output 30 of such manipulation and processing.

For example, a configuration file 22 for an MDTA 12, in accordance with a DOCSIS specification, may be created using one or more DOCSIS file generation tools, as will be appreciated by those skilled in the pertinent arts. The created configuration file 22 may, as referenced hereinabove, describe, among other things, a specific output channel lineup, mapping for an input channel source and tuner frequency assignment (which may be received, for example, via in-band and/or out of band messaging), and the location from which the input channel map information is to be obtained or received. The configuration file 22 may thereby indicate the use of in band and out of band messaging data in order to obtain the desired conversion of input channel map information to the output channel lineup.

The MDTA configuration file 22 may be constituted by a number of configuration settings (preferably one per parameter, for example) of the type-length-value (TLV) form. The TLV configuration settings forming configuration file 22 may be, for example, a stream of octets with no record markers, and in which type is a single-octet identifier which defines the parameter, length is a single octet containing the length of the value field in octets (not including type and length fields), and value is from 1 to 254 octets containing the specific value for the parameter.

Using TLV values allows for unique indications to be made, thereby providing for the generation of unique configuration files encompassing unique configuration settings. For example, TLV sub-types may be used to indicate the Electronic Industries Association (EIA) output channel correspondent to a particular source ID. For example, 217.10.2 may contain the source ID for output channel 2, 217.10.3 may contain the source ID for EIA output channel 3, and so on. Further, the use of sub-types allows for assignment of certain actions to certain subtypes, such as flagging certain subtypes as invalid, such as to generate warning messages, mute duplicate EIA assignments, block output for duplicate source identification assignments, take precedence over auxiliary channel inputs, and/or mute or block unassigned TLV subtypes unless present in an auxiliary output mapping, for example.

Additionally and alternatively, an auxiliary output channel map TLV may be used to map auxiliary input identification(s) to an EIA channel number. Sub-types may be employed to indicate the auxiliary input to be mapped. For example, 217.26.1 may contain the EIA output channel number for auxiliary input 1, and 217.26.3 may contain the EIA output channel number for auxiliary input 3. Further, the use of sub-types allows for support of only certain EIA channels for auxiliary channels, and/or for assignment of certain actions to certain subtypes. For example, certain subtypes may be flagged as invalid, such as to generate warning messages, mute duplicate EIA assignments, block output for duplicate auxiliary input assignments, and grant precedence and priorities based on subtypes, for example.

Figure 4:
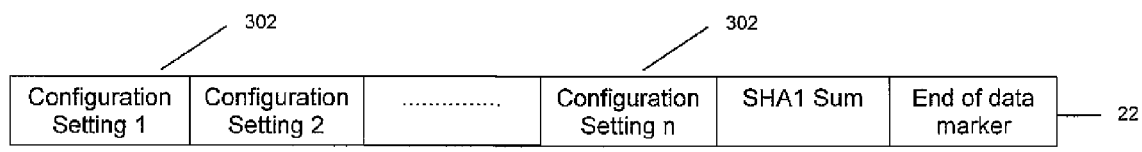
FIG. 4 is a formatting diagram in accordance with an exemplary embodiment of the disclosure.

In an exemplary embodiment with reference to FIG. 4, each of the configuration settings 302 may follow each preceding configuration setting directly in the configuration file 22. Configuration settings 302 may include standard configuration settings that must be present, and standard configuration settings that may be present. An MDTA may be capable of processing all standard configuration settings. An MDTA 12 may ignore, request a refresh, or attempt to re-interpret any configuration setting 302 in the configuration file 22 that is not initially interpreted. To allow uniform management of MDTAs conformed hereto, conformed MDTAs may preferably support consistency in configuration files, such as an 8192-byte configuration file, for example.

FIG. 4 illustrates an exemplary binary configuration file format. Typical configuration settings 302 may include SNMP Community Name (which may have a TLV value of, for example, 217.53.1), output channel map (which may have a TLV value of, for example, 217.10.x), configuration file version (which may have a TLV value of, for example, 217.20.x), and Virtual Channel Table Identification (VCTID, which may have a TLV value of, for example, 217.25.x). Exemplary defined TLV values are illustrated in FIG. 5. TLV values that may be required in certain exemplary embodiments are illustrated in FIG. 6.

Thus, generation of the configuration file may include generating the TLV values for each of the configuration settings 302 required by the MDTA 12, as illustrated in FIG. 7, and optionally calculating the checksum of the configuration settings 302 to add to the configuration file 22 following the last parameter, as illustrated in FIG. 4. A checksum may provide verification of the integrity of the configuration file 22. In other words, the checksum is a checksum that may ensure that the data sent from the provisioning server was not modified en route. For example, the MDTA 12 may recompute the checksum and compare it to the "SHA1" checksum, illustrated in FIG. 4. If the digests do not match, then the configuration file 22 may be discarded. Similarly, if the checksum TLV is not present in the configuration file 22, the MDTA may not perform any checksum verification, but instead may accept and apply configuration data as if the checksum TLV was correct, for example.

As such, the configuration file 22 may provide myriad information and instruction to the MDTA 12. Among this information and instruction may be the aforementioned channel lineup assignments. For example, FIG. 8 illustrate's a simplified configuration file 22, including a VCTID, an EIA channel number assignment, and a unique source identification. The VCTID is a numerical assignment, such as from the in-band messaging, indicating which one of a variety of available channel lineups is in use. In exemplary embodiments, numerous channel lineups may be carouseled, such as based on the day, time of day, or like factors, and the channel lineup to be employed may be indicated by the VCTID assignment. The EIA channel number assignment may be an analog frequency channel assignment. The unique source identification may be a program data source location identifier, whereby, for example, guide data indicative of a particular audiovisual programming channel is assigned. Further, the source identification may have associated therewith information regarding a data type or encoding type for the subject channel. As such, the disclosed MDTA may receive the VCTID assignment from in-band messaging, then may receive a source identification indicating, for example, channel PBS East, and may assess the EIA analog channel number assignment, such as channel 2, in the selected VCTID for PBS East. Thereby, the disclosed MDTA may select the predetermined frequency channel for channel 2, such as a 6 MHz frequency channel as will be understood to those skilled in the art, and assigns channel PBS East thereto.

Thus, the disclosure may provide a channel mapping based on a selected VCTID, such as a tabular formatted channel mapping that displays a currently configured source ID, and short name to EIA output channel number mapping, for example. In an exemplary embodiment, such a tabular format may include EIA channel number, short name and source ID, such as from left to right. Further, such a tabular format may allow for in-band QAM and auxiliary inputs to be shown in the same table, for example. Any EIA output channels which are not mapped may be included in the tabular format and shown as unmapped. Thereby, an output channel map TLV may be used to map source ID to EIA channel number for all channels except auxiliary inputs. This output channel map TLV may, in certain exemplary embodiments, be prioritized over other mappings provided, such as a specified auxiliary input map. Further, in certain exemplary embodiments, the output map table provided by the configuration file may be considered immutable while the MDTA is running, and, in such embodiments, the output map table would thus be modified only through system reboot.

In certain exemplary embodiments, the aforementioned tabular format may readily allow, for example, data insertion to occur on EIA channels. For example, a source ID may include multiple sources, such as wherein video content and one or more insertions are obtained from multiple locations keyed to the source ID, wherein multiple sources are keyed to an EIA channel with instructions as to how to display the multiple sources together, or wherein an insertion occurs at the source such that data is received from the source ID with certain insertions or instructions. Such insertions may include, for example, overlays, watermarks, advertisements, alternative content, interruptive comment, banners, and the like.

As discussed hereinthroughout, in-band messaging may include control and other information messages and data received by, for example, an MDTA, via the content payload channel. In typical exemplary embodiments, in-band messaging may include, for example, conditional access messages, such as entitlements, service information messages, Emergency Alert System (EAS) messages, and other messages.

In band messaging may be QAM (Quadrature Amplitude Modulation) demodulated by, for example, the MDTA. In typical embodiments, in-band messaging may employ a single, QAM-tuned tuner. Thereby, a DTA employing only in-band messaging may receive and decode only a single channel lineup. As such, the in-band messaging is typically acquired more quickly, such as by the MDTA, due to the more limited nature of the information in the in-band messaging as compared to the out of band messaging discussed hereinbelow.

As discussed hereinthroughout, out of band messaging may include control and other information messages and data received, for example, via a separate control channel. In typical exemplary embodiments, out of band messaging may include, for example, conditional access messages, such as entitlements, service information messages, and other messages.

Out of band messaging may be transmitted over a number of different RF transmission schemes, such as QPSK (Quadrature Phase Shift Keying), which may be demodulated by, for example, the MDTA. Out of band messaging may be employed, for example, for an MDTA receiving many channel lineups. The out of band information may include, for example, decryption information for a particular pay channel, wherein that pay channel is received only when certain ones of the many channel lineups are instituted for the MDTA as indicated by the selected VCTID.

Figure 9:
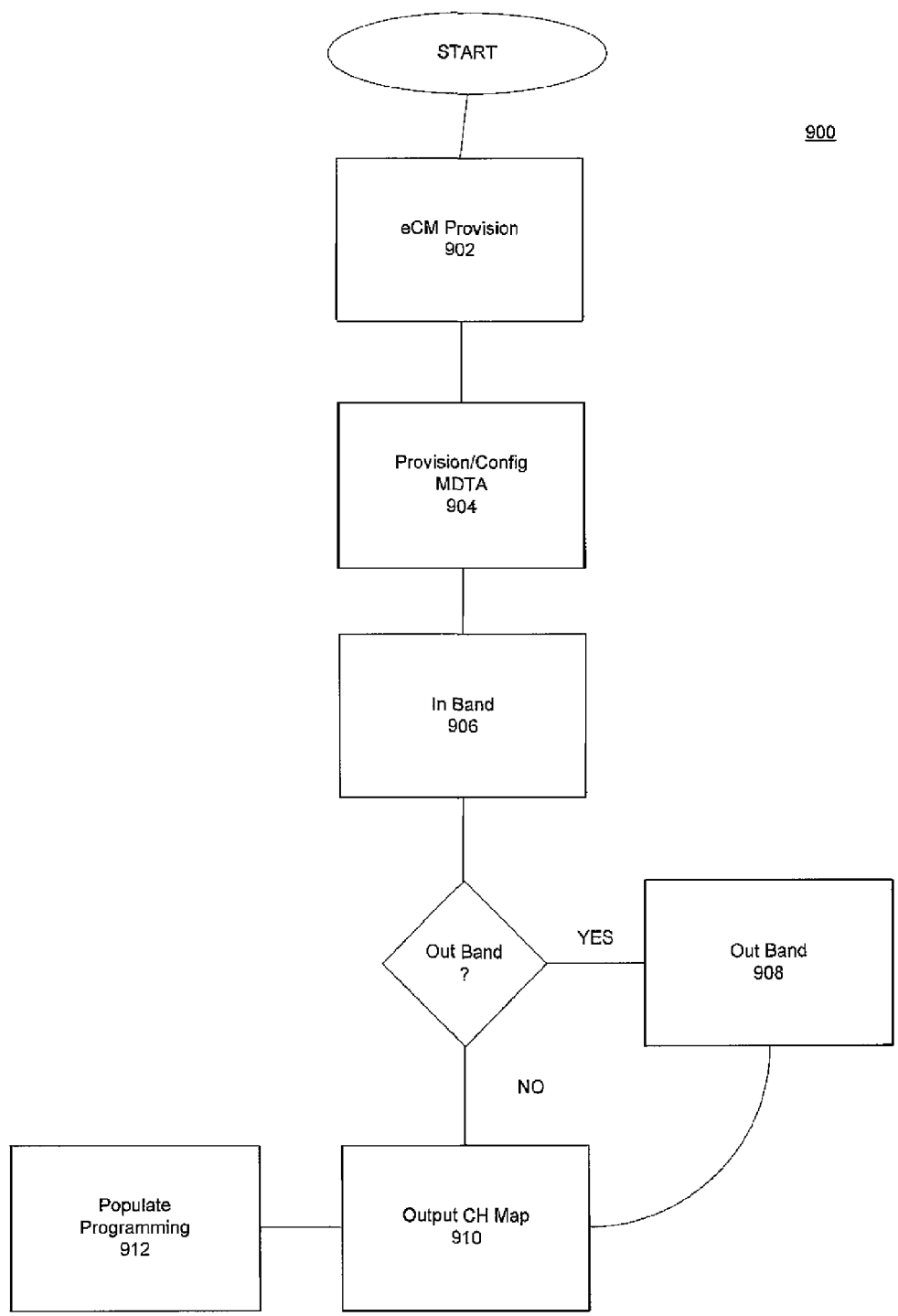
FIG. 9 is a flow diagram illustrating a method in accordance with an exemplary embodiment of the disclosure.

With reference to FIG. 9, the embodiments disclosed include a method 900 wherein a DOCSIS style provisioning method provides an IP address and a configuration file for an eCM at step 902, and, uniquely in accordance with the disclosure, wherein a DOCSIS style methodology provides an IP address and a configuration file to an MDTA at step 904 as discussed hereinthroughout. The eCM may preferably be used to receive this DOCSIS style configuration file, as discussed herein.

Upon receipt of the configuration at step 904, the MDTA may begin operation by, among other actions, acquiring in-band messaging at step 906 and, in certain embodiments, acquiring out of band messaging at step 908. Thereafter, an output channel map, for example, or another input, may be generated at step 910 by the MDTA in accordance with the configuration, and by incorporating the in-band and out of band messaging with that configuration. Program output may then begin by a decoding and generation of programming at step 912 based on the output channel map.

Those of ordinary skill in the art will recognize that many modifications and variations of the disclosure may be implemented without departing from its spirit or scope. Thus, it is intended that the disclosure cover the modifications and variations, provided they come within the scope of the appended claims and their equivalents.

What is claimed is:

1. An apparatus, comprising:
   a receiver configured to:
   receive, from a remote device, a configuration file in type-length-value format containing a virtual channel table identification, a first plurality of source identifications, and a plurality of channel assignments,
   receive a plurality of media streams, and treat type-length-value subtype fields as an instruction to map an auxiliary input to a channel number; and a video generation device, configured to provide the media streams to a plurality of devices at a first premises based on the configuration file, and to provide an output channel lineup to the plurality of devices based on the configuration file, wherein the output channel lineup maps each of the first plurality of source identifications to a corresponding channel assignment of the plurality of channel assignments as dictated by the identified virtual channel table.

2. The apparatus of claim 1, wherein the output channel lineup comprises an analog output.

3. The apparatus of claim 1, wherein said receiver comprises a digital receiver.

4. The apparatus of claim 1, wherein said receiver comprises an analog and digital receiver.

5. The apparatus of claim 1, wherein at least one source identification of the first plurality of source identifications identifies the auxiliary input, and wherein the auxiliary input is local to the apparatus.

6. The apparatus of claim 1, wherein the receiver and the video generation device comprise a multi-dwelling transport adaptor.

7. The apparatus of claim 1, further comprising a memory storing a plurality of virtual channel tables.

8. The apparatus of claim 1, wherein the receiver is further configured to:

receive a second plurality of source identifications, wherein the second plurality of source identifications differs from the first plurality of source identifications; and map at least one of the second plurality of source identifications to a corresponding at least one of the plurality of channel assignments according to the channel lineup identified by the virtual channel table identification to generate a second output channel lineup.

9. The apparatus of claim 8, wherein at least one of the second plurality of source identifications identifies the auxiliary input, and wherein the auxiliary input is local to the apparatus.

10. A method, comprising:

receiving, at a device,
a first virtual channel table identification identifying a first channel lineup of a plurality of stored channel lineups;
a second virtual channel table identification identifying a second channel lineup of the plurality of stored channel lineups;
a first plurality of source identifications; and
a plurality of channel assignments;

generating a first output channel lineup by mapping at least one of the first plurality of source identifications to a corresponding at least one of the plurality of channel assignments according to the first channel lineup identified by the first virtual channel table identification;

generating a second output channel lineup by mapping at least one of the plurality of source identifications to a corresponding at least one of the plurality of channel assignments according to the second channel lineup identified by the second virtual channel table identification, wherein the second output channel lineup differs from the first output channel lineup; and using the different first and second output channel lineups to provide users with different channel lineups at different times.

11. The method of claim 10, wherein the device comprises a multi-dwelling transport adaptor.

12. The method of claim 10, further comprising generating video content in accordance with the first or second output channel lineup.

13. The method of claim 10, further comprising storing a plurality of virtual channel tables at the device.

14. The method of claim 10, further comprising:
receiving different virtual channel table identifications and channel lineups at different times of the day; and
providing different output channel lineups based on the time of day.

* * * * *